(12) United States Patent
Ueda

(10) Patent No.: US 6,336,162 B1
(45) Date of Patent: *Jan. 1, 2002

(54) DRAM ACCESS METHOD AND A DRAM CONTROLLER USING THE SAME

(75) Inventor: Makoto Ueda, Kyoto (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,366

(22) Filed: Feb. 26, 1999

(30) Foreign Application Priority Data

Mar. 3, 1998 (JP) .......................... 10-050751

(51) Int. Cl.$^7$ .............................................. G06F 12/00
(52) U.S. Cl. ...................... 711/105; 711/105; 711/154; 711/203; 365/203; 365/222; 365/228
(58) Field of Search ................................ 711/105, 154, 711/203; 365/203, 222, 228

(56) References Cited

U.S. PATENT DOCUMENTS

| 5,265,236 A | * | 11/1993 | Mehring et al. | ............ | 711/203 |
|---|---|---|---|---|---|
| 5,651,130 A | | 7/1997 | Hinkle et al. | ................ | 395/432 |
| 5,715,421 A | * | 2/1998 | Akiyama et al. | ............ | 365/203 |

FOREIGN PATENT DOCUMENTS

| JP | 64-59692 | 3/1989 | ............ G11C/7/00 |
| JP | 07-084866 | 3/1995 | ............ G06F/12/02 |
| JP | 7-210456 | 8/1995 | |
| JP | 10-49436 | 2/1998 | |
| JP | 10-097788 | 4/1998 | ......... G11C/11/401 |

\* cited by examiner

Primary Examiner—Do Hyun Yoo
Assistant Examiner—Mehdi Namazi
(74) Attorney, Agent, or Firm—Robert A. Walsh

(57) ABSTRACT

A method for accessing to a DRAM and a DRAM controller of the same, which enables a high speed DRAM access and a DRAM controller.

Provided is an accessing method to a DRAM, which comprises the steps of detecting an access type to the DRAM; and changing an access mode depending on the detected access type. Furthermore, provided is an accessing method to a DRAM which comprises the steps of detecting whether a currently accessed row address and an address lastly accessed; and changing an access mode depending on an existence of the coincidence of the detected row addresses.

5 Claims, 4 Drawing Sheets

DRAM ACCESS METHOD AND A DRAM CONTROLLER USING THE SAME

FIELD OF THE INVENTION

The present invention generally relates to a control for a dynamic random access memory (hereinafter referred to as a DRAM), more specifically to a high speed access method to the DRAM and a DRAM controller for controlling the DRAM.

BACKGROUND OF THE INVENTION

In order to increase a processing speed of a computer system including the DRAM, it is necessary to shorten an access time to the DRAM. A paging method has been used to shorten the access time to the DRAM in the prior art. The paging method is the one in which in the access to the DRAM a row address is fixed after it is once designated (a RAS access) and data is read out in response to a designation of a column address(a CAS address). The paging method has an advantage that the paging method is capable of performing a high speed access because of the less number of RAS access times than those of the so-called RANDOM access method (RAS access mode method) in which the RAS access and the CAS address are performed alternately.

The Japanese Patent Laid Open No. Hei 3-25785 discloses a memory device which uses the conventional paging method. FIG. 1 shows a flow chart of an access to this memory device. Referring to FIG. 1, after starting of the access, the presently accessed row address and the lastly accessed address stored in the register are compared. If both the row addresses coincide with each other, the row address is sent out, and the CAS access is performed. If both the row addresses do not coincide with each other, the row address and the column address are sent out after precharging, and the RAS access and the CAS address are performed.

The access method using the paging method shown in FIG. 1 enables a high speed access because only the CAS access is performed when the row addresses coincide with each other. However, in this conventional access method, when the row addresses do not coincide with each other, the RAS and CAS accesses must be performed after the precharging. Consequently, when the row addresses do not coincide, the conventional access method inherently involves a drawback that an access operation to the DRAM is delayed by the precharging time rather than in the random access method. That is, it may be said that the paging method is useful only in a local access to the final. Noted that the word "local access" means the one in which the access is performed intensively for a certain address group (area) in the memory.

The memory control circuit which has improved the drawback of the conventional paging method is disclosed in Japanese Patent Laid Open No. Hei 7-84866. In this memory control circuit, a method is disclosed, in which utilizing the localization of the access the possibility of a coincidence of the row address with the lastly accessed row address is predicted at the time when a demand for the access is issued and an access mode is changed.

However, in this case, as a condition for detecting the possibility of the coincidence of the row addresses in the memory access, it is utilized whether access subjects coincide with each other. Here, the access subject is generally called a bus master. Therefore, in this memory control circuit, an access subject number must be newly introduced into a register and a comparison circuit and the like for the access subject number must be additionally provided.

Moreover, in the foregoing Japanese Patent Laid Open No. Hei 7-84866, no access method which pays an attention to an access type is referred.

SUMMARY OF THE INVENTION

The object of the present invention is to provide a DRAM access method and a DRAM controller which enables a high speed DRAM access.

Another object of the present invention is to provide a DRAM access method and a DRAM controller which further improve a conventional paging method.

Still another object of the present invention is to provide a novel DRAM access method and a DRAM controller which tracks the localization of a DRAM access and a relation between a DRAM access type and an access mode.

Still further another object of the present invention is to provide a method which forecasts a localization of a DRAM access based on a certain hint, thereby enabling a high speed DRAM access and a DRAM controller.

According to the present invention, there is provided an access method to a DRAM which comprises the steps of detecting an access type to the DRAM; and changing an access mode in response to the detected access type. Here, the word access type means either an instruction access or a data access. Moreover, the word access mode means either a paging mode or a random access mode.

Furthermore, according to the present invention, there is provided an access method to a DRAM which comprises the steps of detecting whether a currently accessed row address and a lastly accessed row address coincide; and changing an access mode in response to an existence of the coincidence of the detected row addresses.

Still furthermore, according to the present invention, there is provided a controller for controlling a DRAM, which comprises means for detecting an access type to the DRAM in response to a signal from a processor; and means for changing an access mode to the DRAM in response to the detected access type.

Still furthermore, according to the present invention, there is provided a controller for controlling a DRAM which comprises means for detecting whether a currently accessed row address and a lastly accessed row address are coincident; and changing an access mode in response to an existence of the coincidence of the detected row addresses.

BRIEF DESCRIPTION OF THE DRAWINGS

The invention, as well as a preferred mode of use, further objects and advantages thereof, will best be understood by references to the following detailed description of an illustrative embodiment when read in conjunction with the accompanying drawings, wherein.

DETAILED DESCRIPTION OF THE INVENTION

It has been discovered that the probability of a coincidence between a currently accessed row address and an immediately previously accessed row address (page hitting) differs depending on the DRAM access type. Specifically, the probability of the page hitting in case of the instruction access is higher than that in case of the data access. In other words, it has been found that a degree of the localization of the access is high. Here, the word command access means the one to a program, and the word data access literally means the one to the data. Moreover, as a result of investigations of frequencies of occurrences of the command and data accesses, the present invention is directed to the probability of a consecutive occurrence of each of the two accesses is high. Therefore, the present invention uses the probability of a consecutive occurrence of each of the page hitting and the page miss is high. Thus, in a word, the present invention was made by noting the DRAM access type and the localization of the access, i.e., the probability of the page hitting and the frequency of the occurrence of the same access.

Figure 1:
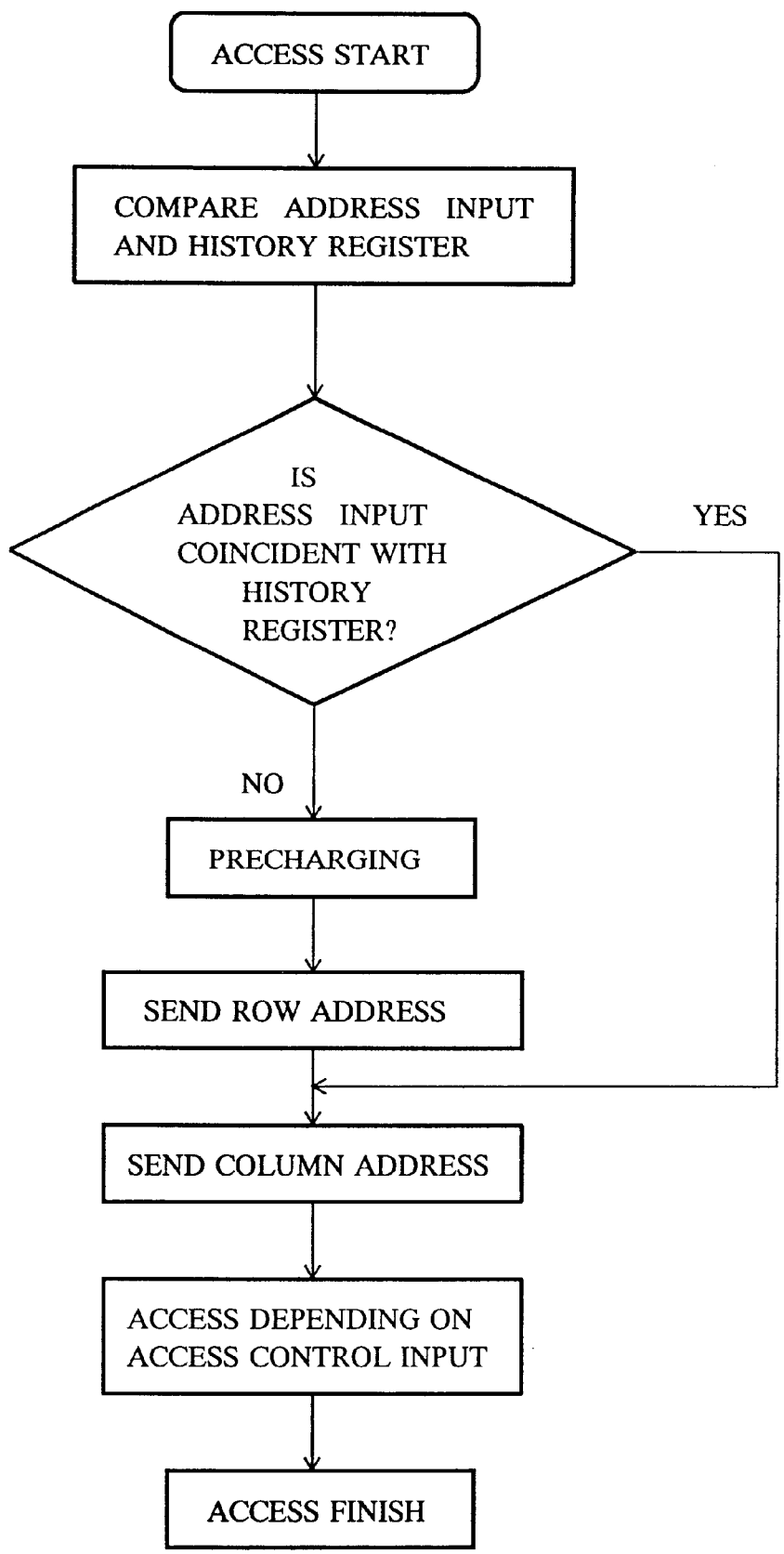
FIG. 1 is a flow chart showing the flow of a memory control using a conventional paging method.
Figure 2:
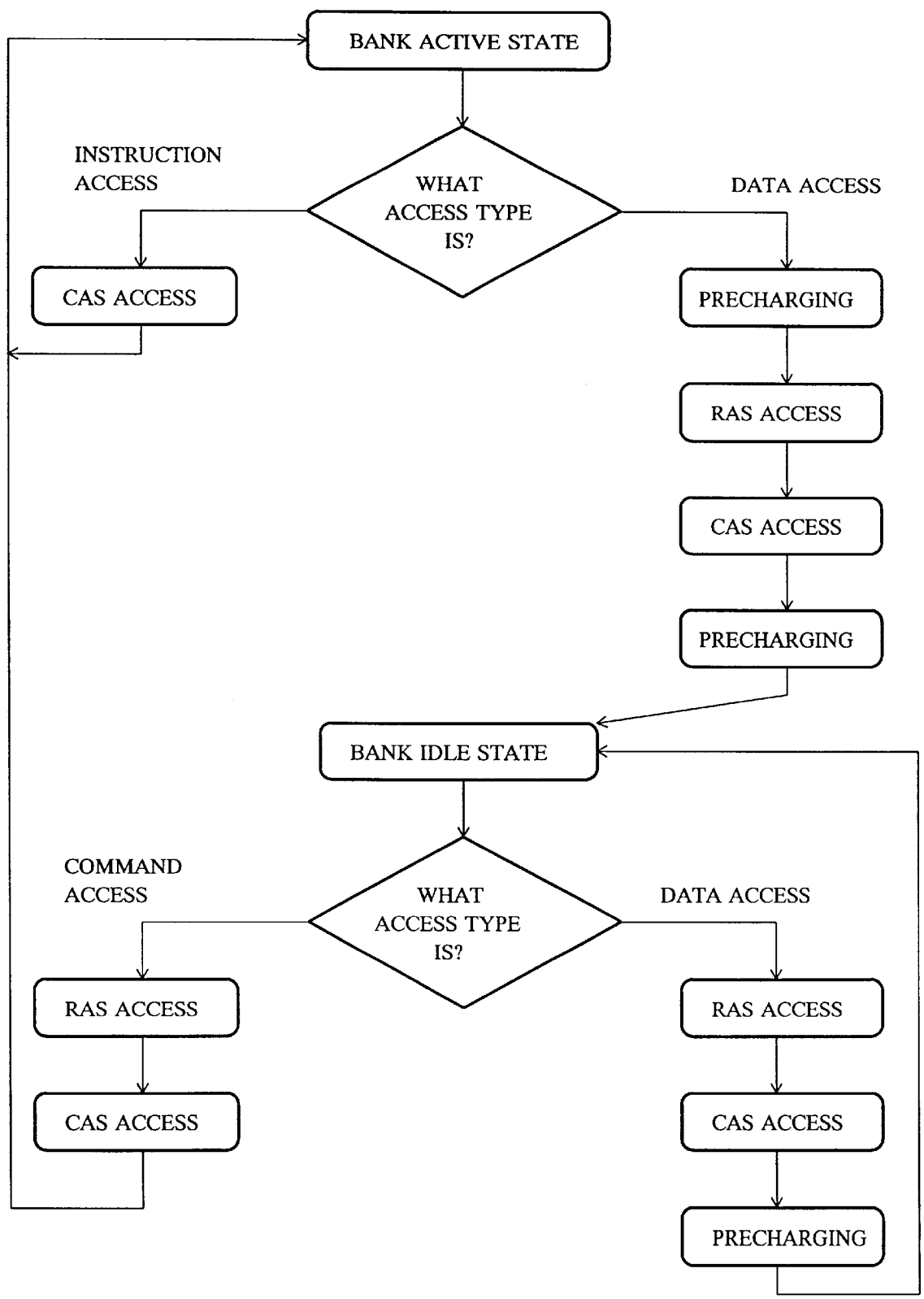
FIG. 2 is a flow chart showing the flow of a DRAM access method of an embodiment of the present invention.

FIG. 2 shows a flow chart for executing a DRAM access method of a first embodiment of the present invention. Referring to FIG. 2, an access starts from a bank active state, that is, a state where a paging mode is selected and a row selection (RAS access) is being already performed. At first, it is detected whether a DRAM access type is an instruction access or a data access.

In the case where the access type is the instruction access, the paging mode is maintained without changing the access mode and only a CAS access is performed. Then, the access is finished. In other words, in the case where the access type is the instruction access, it is predicted that an access subsequent to this command access will be the instruction access. The flow restores to the bank active state without performing precharging.

On the other hand, in the case where the access type is the data access, the access mode is changed from the paging mode to the random access mode. After the precharging is performed, RAS and CAS accesses are performed sequentially. Further, precharging is performed finally and the access is finished. In other words, in the case where the access type is the data access, it is predicted that an access subsequent to the data access will be the data access and the precharging is performed. The flow advances to the bank active state. In other words, the flow advances to a state where the RAS access is not performed (RAS mode).

From the bank idle state (RAS mode) shown in FIG. 2, a next access start. Similar to the bank active state, at first, the access type is detected. In the case where the access type is the instruction access, RAS and CAS accesses are sequentially performed and then the access is finished. At this time, the precharging which is ordinarily performed in the RAS access mode is not performed. In other words, in the case where the access type is the instruction access, it is predicted that an access subsequent to this command access will be the instruction access. Without precharging, the flow advances to the bank active state, that is, the flow moves to the paging mode.

On the other hand, in the case where the access type is the data access, RAS and CAS accesses are sequentially performed and the precharging is performed, thereby finishing the access. In other words, in the case where the access type is the data access, it is predicted that an access subsequent to this data access will be the data access. The precharging is performed and the bank idle state, that is, the state where the RAS access is not performed is maintained (RAS mode).

In the flow of FIG. 2, the access modes are changed depending on the DRAM access type. Specifically, using as a hint the detection showing whether the access type is the instruction access or the data access, it is predicted whether a next access is the paging mode or the RAS mode, and any one of these two modes is automatically selected. In this case, the existence of the coincidence between the currently accessed row address and the lastly accessed row address is not considered. This method is grounded upon measurement that a probability of a consecutive occurrence of each of the two accesses is high. According to this method, in the case where the access type is the data access, the RAS mode is compulsorily selected regardless of the existence of the coincidence of the row addresses. Therefore, unlike the conventional paging method, the drawback that the precharging must be conducted every time with the row addresses not being coincident with each other can be avoided.

Figure 3:
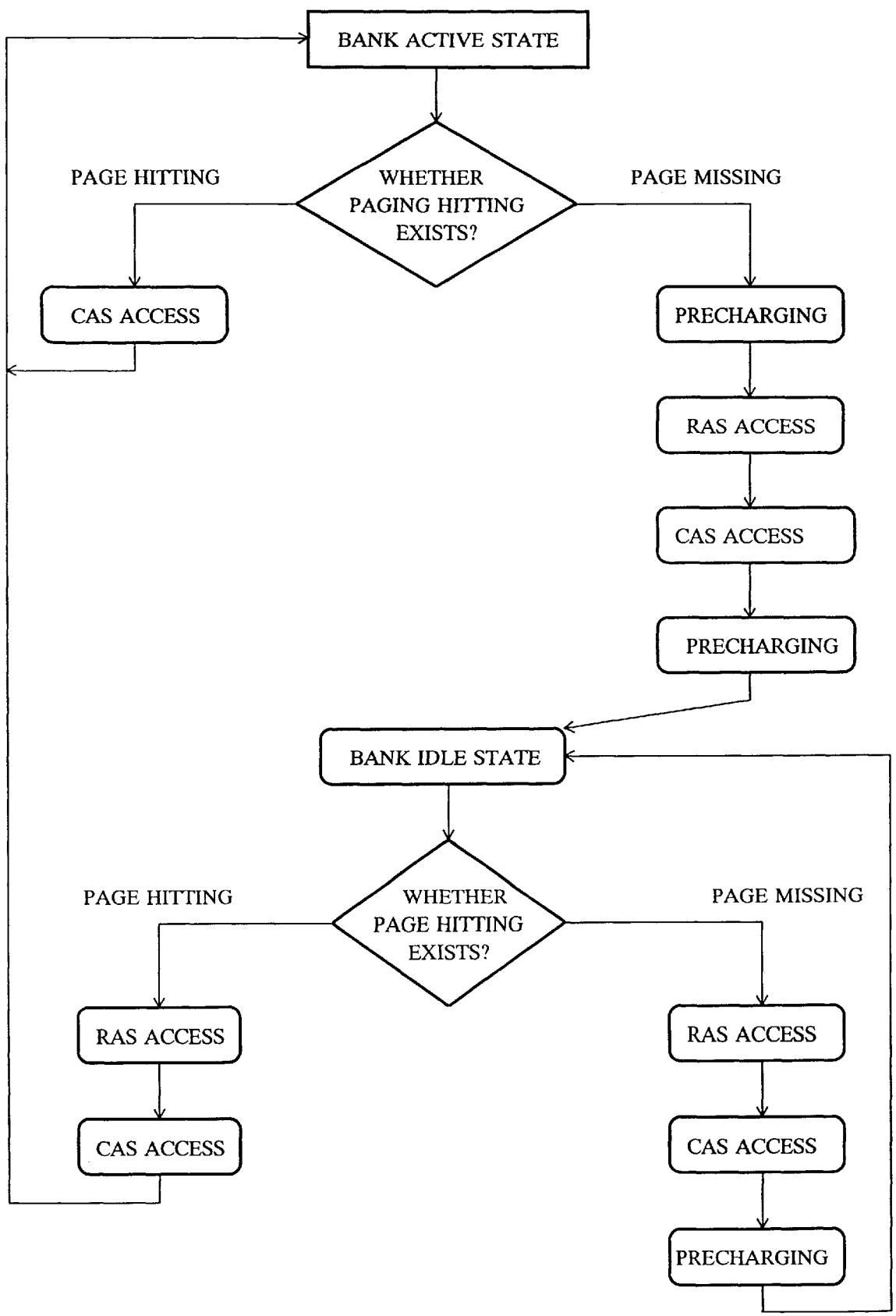
FIG. 3 is a flow chart showing the flow of a DRAM access method of another embodiment of the present invention.

FIG. 3 is a flow chart showing the flow of a DRAM access method of a second embodiment of the present invention. Referring to FIG. 3, an access starts from a bank active state, that is, a state where a page mode is selected and a row selection (RAS access) is being already performed. At first, an existence of the page hitting is detected, that is, it is detected whether the currently accessed row address is coincident with the lastly accessed address.

When the page hitting occurs, that is, when the row addresses are coincident, the paging mode is maintained without changing the access mode, so that only a CAS access is performed and the access is finished. In other words, when the page hitting occurs, it is predicted that a row address to be subsequently accessed will be coincident with that lastly accessed. Thus, the flow restores to the bank active state without performing precharging.

On the other hand, when the page missing occurs, that is, when the row addresses are not coincident, the access mode is changed from the paging mode to the random access mode. After the precharging, the RAS and CAS accesses are performed sequentially. Furthermore, the precharging is finally performed and the access is finished. In other words, when the page missing occurs, it is predicted that a row address to be accessed subsequently is not coincident with that lastly accessed, and the precharging is performed, so that the flow moves to the bank idle state, that is, the flow moves to the state where the RAS access is not performed (RAS mode).

A next access is further started from the bank idle state (RAS mode) of FIG. 3. Then, similar to the case of the bank active state, an existence of the page hitting is detected, that is, it is detected whether the currently accessed row address is coincident with the lastly accessed address. When the page hitting occurs, after performing RAS and CAS accesses, the access is finished. At this time, no precharging to be ordinarily executed in the RAS access mode is performed. In other words, when the page hitting occurs, it is predicted that the page hitting will occur in the next access, and the flow moves to the bank active state without performing the precharging, that is, the flow moves to the paging mode.

On the other hand, when the page missing occurs, that is, when no coincidence of the row addresses exists, RAS and CAS accesses and precharging are performed, and then the access is finished. In other words, when the page missing occurs, it is predicted that the page missing will occur in the next access and the precharging is performed so that the bank idle state is maintained. That is, the state where the RAS access is not performed (RAS mode) is maintained.

In the flow chart shown in FIG. 3, the access mode is changed depending on the existence of the page hitting.

Specifically, taking a hint from the existence of the page hitting, it is predicted whether the page hitting occurs in the next access. An access mode is automatically selected in response to the occurrence of the page hitting. This method is based upon measurement that a probability that each of the page hitting and the page missing occurs consecutively is high. According to this method, when the page missings occur consecutively, the consecutive selection of the RAS mode is made compulsorily. Therefore, it is possible to avoid the drawback that the precharging must be conducted every time with the occurrence of the page missing which has been a problem in the conventional paging method.

Figure 4:
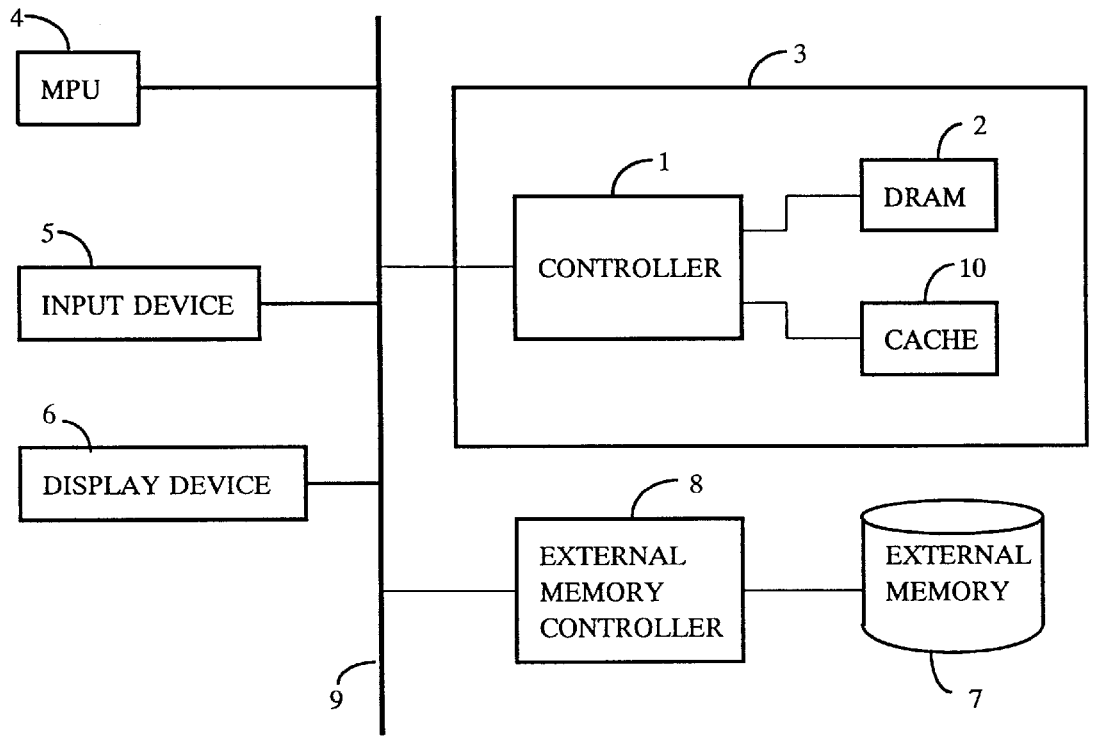
FIG. 4 is a block diagram showing a computer system which comprises a DRAM controller of the embodiment of the present invention.

FIG. 4 is a block diagram showing an embodiment of a computer system which comprises a controller for controlling the DRAM of the present invention. Through the bus 9, the micro processor 4, the input device, the display device 6, the external memory controller 8, and the internal memory 3 are coupled to each other. In the internal memory 3, included are the DRAM controller 1 of the present invention, the DRAM 2, and the CACHE memory 10. It is needless to say that other memories such as a SRAM are included in the internal memory.

Figure 5:
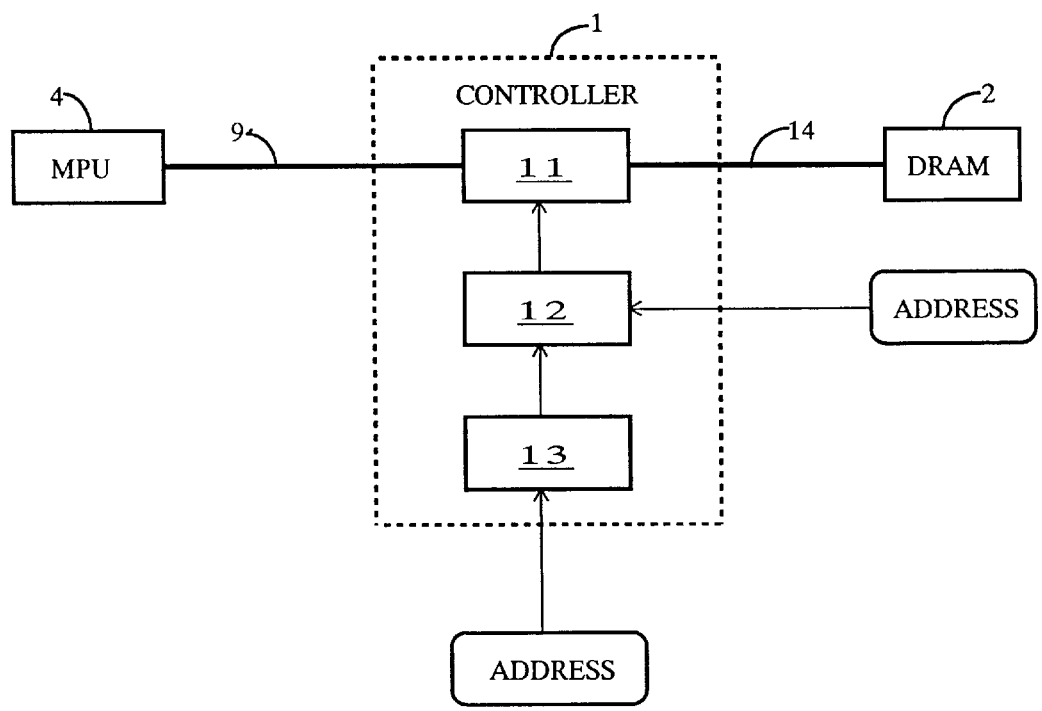
FIG. 5 is a block diagram showing a structure of the DRAM controller of the embodiment of the present invention.

FIG. 5 is a block diagram showing a structure of an embodiment of the DRAM controller 1 of the present invention. The controller 1 comprises the control section 11, the comparison circuit 12, and the register circuit 13. In the control section in this embodiment, included are means for detecting the access type to the DRAM in response to a signal from the processor, means for changing the access mode for the DRAM depending on the detected access type, and a multiplexer.

From the CPU 4 to the controller 1, a signal is sent indicating the access type to the memory access, that is, the instruction access or the data access through the bus 9. In response to the signal supplied thereto from the CPU 4, the control section 11 performs control operations according to the flow shown in FIG. 2. Specifically, the detection means in the control section 11 detects the access type based on this signal. The changing means in the control section 11 generates control signals in accordance with the detected access type. The control signals such as a RAS access signal, a CAS access signal and an address signal are sent to the DRAM 2 from the control section 11 through the signal line 14. Note that the control signals are simultaneously sent also to the CACHE memory 10.

The register circuit 13 holds the history of an address signal inputted thereto. At the same time, the register circuit 13, on occasion, outputs the address signal to the comparison circuit 12. The address signal includes the row address and the column address. The comparison circuit compares the currently accessed address with the lastly accessed address previously sent from the register circuit 13, and outputs the comparison result to the control section 11. Depending on the signal as the comparison result, the control section 11 performs the control operations in accordance with the flow shown in FIG. 3. Specifically, the control section 11 selectively sends out the control signals such as the RAS access signal, the CAS access signal and the address signal to the DRAM 2 through the signal line 14. Noted that the control signals are simultaneously sent also to the CACHE memory 10.

As described above, in the present invention, the access type of the next access and the existence of the page hitting in the next access are predicted depending on the access type and the existence of the page hitting, whereby the access mode is selected. Therefore, unlike the conventional paging method, it is unnecessary to perform the precharging every time when no page hitting occurs, so that a high speed access to the DRAM will be enabled. Moreover, according to the present invention, the access to the DRAM in response to continuity of the sort of the access and continuity of the page hitting/missing can be performed. Therefore, also in this respect, a high speed DRAM access can be achieved.

The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention.

Therefore, it is intended that the following claims cover all such modifications and changes as fall within the true spirit and scope of the invention.

What is claimed is:

1. A method for accessing to a DRAM comprising the steps of:

detecting a DRAM access type, wherein said access type includes an instruction access or a data access; and changing an access mode depending on the detected access type, wherein when said access type is the instruction access, a paging mode is selected for a current access and maintained even when a row address currently accessed is not coincident with a row address lastly accessed, and when said access type is the data access, a random access mode is selected for said current access and maintained even when a row address currently accessed is coincident with a row address lastly accessed.

2. A controller for controlling a DRAM comprising:

means for detecting an access type to the DRAM in response to a signal from a processor, wherein said means for detecting said access type includes a detection of whether said access type is an instruction access or a data access; and means for changing an access mode to the DRAM depending on the detected access type, wherein when said access type is the instruction access, a paging mode is selected for a current access and maintained even when a row address is not coincident with a row address currently accessed lastly accessed, and when said access type is the data access, a random access mode is selected for a and maintained even when said currently accessed row address currently accessed is coincident with a row address lastly accessed.

3. The method according to claim 1, wherein when said access type is the data access, it is predicted than an access subsequent to the data access is another data access and then the access is finished after precharging.

4. The method according to claim 1, wherein when said access type is the instruction access, it is predicted than an access subsequent to the instruction access is another command access and then the access is finished without precharging.

5. The controller according to claim 2, wherein when said access type is the instruction access, it is predicted that an access subsequent to the instruction access is another instruction access and then the access is finished without precharging; and when said access type is the data access, it is predicted that an access subsequent to the data access is another data access and the access is finished after performing precharging.

* * * * *